Patented Sept. 4, 1934

1,972,450

UNITED STATES PATENT OFFICE 1,972,450

PRODUCTION OF DERIVATIVES OF AMINO-6-METHYL-2-HEPTENE-2

Wilfrid Klavehn, Mannheim, Germany, assignor, by mesne assignments, to E. Bilhuber, Incorporated, Jersey City, N. J., a corporation of New Jersey No Drawing. Application June 14, 1932, Serial No. 617,242. In Germany July 1, 1931

7 Claims. (Cl. 260—127)

Hitherto papaverine and its derivatives have principally been employed in therapy for removing spastic conditions. These compounds with rather complicated structure belong chemically to the isoquinoline series.

A group of compounds having a simple structure and spasmolytic properties similar to those of papaverine has now been found in the series of aliphatic unsaturated amines. By reason of their hereinafter described mode of formation, these compounds must be regarded as derivatives of amino-6-methyl-2-heptene-2.

The present invention deals with the production of these new substances by condensation of methyl-2-heptene-2-one-6 with primary amines followed by a partial reduction of the condensation product. These two reactions can also be carried out in one operation.

The new bases are mostly colorless, very mobile oils of characteristic odor and are obtained in good yield and in a state of outstanding purity. With organic acids, such as, for example, tartaric acid, citric acid, camphoric acid and barbituric acid or their derivatives, these bases give beautifully crystallizing compounds.

Example 1

50.4 gms. of methyl-2-heptene-2-one-6, dissolved in 120 ccs. of alcohol, are mixed with 55 gms. of an aqueous 30% solution of methylamine and added, in the course of an hour, to 32 gms. of activated aluminium and 200 ccs. of 50% alcohol with stirring and, if required, with cooling. After the partial reduction, the reaction mixture is mixed with dilute mineral acid by which the acid salt of the unsaturated amine methylamino-6-methyl-2-heptene-2 is formed, the alcohol is distilled off and the mixture is finally treated with steam to remove non-basic constituents. On the addition of alkali, the unsaturated base separates out and is distilled over with steam.

The base obtained is methylamino-6-methyl-2-heptene-2 which boils at 176 to 178° C. The picrate of the base crystallizes from water in small bright yellow plates having a melting point of 70° C., its urea crystallizes from water in prisms having a melting point of 85° C., and its phenyl urea crystallizes from dilute alcohol in needles having a melting point of 84.5° C. The yield is 90 to 95% of the theoretical.

Example 2

50.4 gms. of methyl-2-heptene-2-one-6, dissolved in 150 ccs. of ether, are mixed with a solution of 15 gms. of methyl-amine in 250 ccs. of ether. On slightly warming, condensation takes place. The ethereal solution is dried with potassium carbonate and concentrated and the residue is distilled under reduced pressure. The boiling point of the N dehydromethylamino-6-methyl-2-heptene-2 which is produced is 65 to 67° C. at a pressure of 8 mms. Dilute acids decompose the base into the components.

41.7 gms. of N dehydromethylamino-methyl-heptene are dissolved in 300 ccs. of ether, mixed with 30 gms. of activated aluminium and subjected to a partial reduction with the addition of a total of 40 gms. of water. The working up is effected in the known manner. The yield of methylamino-6-methyl-2-heptene-2 is almost quantitative.

In the expression N dehydromethylamino-6-methyl-2-heptene-2 the syllables N dehydro means nitrogen dehydro and signifies that there is an unsaturated double bond between nitrogen and an adjacent carbon atom.

Example 3

A solution of 50.4 gms. of methyl-2-heptene-2-one-6 and 62 gms. of a 30% methylamine solution in 200 ccs. of methyl alcohol is mixed with 75 gms. of sulphurous acid in 350 ccs. of methyl alcohol and 200 ccs. of water. After adding 80 gms. of zinc dust, the whole is heated to boiling point under a reflux condenser by which means an incomplete reduction takes place and the formation of the sulphate of the unsaturated amine. The reaction mixture is filtered after two to three hours and the filtrate is concentrated under reduced pressure; non-basic constituents are shaken out with ether or benzene. On the addition of alkali, methylamino-6-methyl-2-heptene-2 separates out. The yield is 65 to 75% of the theoretical.

Example 4

50.4 gms. of methyl-2-heptene-2-one-6 and 62 gms. of a 30% methylamine solution are dissolved in 250 ccs. of ether with the addition of a small quantity of alcohol and treated in the course of two hours with 46 gms. of sodium with the addition of a total of 100 ccs. of water. The partial reduction is effected with stirring under a reflux condenser. The working up is effected in the known manner. The yield is 35 to 45% of the theoretical.

Example 5

31.5 gms. of methyl-2-heptene-2-one-6 and 8.5 gms. of methylamine are dissolved in 150 ccs.

of 50% alcohol, are mixed with a solution of 70 gms. of methylamine hydrochloride in 200 ccs. of water and cathodically partially reduced. When a lead cathode is employed, a current density of 3 amperes per 100 square centimetres and a voltage of 7 to 8 volts are required. A saturated solution of sodium carbonate is used as the anode liquid. The yield is 30 to 40% of the theoretical.

*Example 6*

37.8 gms. of methyl-2-heptene-2-one-6 in 250 ccs. of ether are subjected to catalytic partial hydrogenation in the presence of 12 gms. of methylamine and 100 ccs. of a 1% colloidal solution of platinum. After the rather slow absorption of the calculated quantity of hydrogen, the hydrogenation is stopped and the product of the reaction is worked up in the known manner. The yield is 60% of the theoretical.

*Example 7*

63 gms. of methyl-2-heptene-2-one-6 and 18 gms. of methylamine are dissolved in 500 ccs. of alcohol and are subjected to hydrogenation in the presence of hydrogen and 20 gms. of nickel catalyst under a pressure of 40 atmospheres and at a temperature of 70 to 80° C. The partial hydrogenation is ended after a few hours. The working up is effected in the known manner. The yield is 75 to 85% of the theoretical.

*Example 8*

50.4 gms. of methyl-2-heptene-2-one-6 are, in the presence of 20 gms. of ethylamine in 125 ccs. of 70% alcohol and 500 ccs. of ether, partially reduced with 30 gms. of activated aluminium. After the partial reduction is ended, the whole is filtered and worked up in the known manner. Ethylamino-6-methyl-2-heptene-2 is a colorless oil of an agreeably weak basic odor and boils at 66 to 68° C. under a pressure of 6 mms. The yield is almost quantitative.

The material activated aluminium referred to in the above examples is aluminium which has been superficially amalgamated with mercury. On contact with water it liberates hydrogen. It is a material like that described in British Patent #336,412.

What I claim and desire to secure by Letters Patent of the United States is:—

1. A process of manufacturing derivatives of amino-6-methyl-2-heptene-2 consisting in condensing methyl-2-heptene-2-one-6 with an amine selected from the group consisting of methylamine, ethylamine, and partially hydrogenating the condensation product.

2. A process of manufacturing derivatives of amino-6-methyl-2-heptene-2 consisting in condensing methyl-2-heptene-2-one-6 with a primary alkylamine of the lower aliphatic series and partially hydrogenating the condensation product.

3. A process according to claim 2 in which the condensation and reduction is carried out in one operation.

4. N-mono alkyl derivatives of amino-6-methyl-2-heptene-2 in which there is a substitution in the amino group of a radical selected from the group consisting of methyl, ethyl.

5. An N-mono alkyl derivative of the lower aliphatic series of amino-6-methyl-2-heptene-2.

6. Methylamino-6-methyl-2-heptene-2.

7. Ethylamino-6-methyl-2-heptene-2.

WILFRID KLAVEHN.

CERTIFICATE OF CORRECTION.

Patent No. 1,972,450. September 4, 1934.

WILFRID KLAVEHN.

It is hereby certified that error appears in the printed specification of the above numbered patent requiring correction as follows: Page 1, line 93, for "75%" read 70%; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.